US006295916B1

(12) United States Patent
Horner

(10) Patent No.: US 6,295,916 B1
(45) Date of Patent: Oct. 2, 2001

(54) RETURN SPRING ARRANGEMENT FOR BRAKE BOOSTER

(75) Inventor: Charles Byron Horner, South Bend, IN (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/580,146

(22) Filed: May 30, 2000

(51) Int. Cl.[7] ............................................. F15B 9/10
(52) U.S. Cl. ............................................. 91/376 R
(58) Field of Search ............................ 91/368, 372, 374, 91/376 R, 387; 60/547.1

(56) References Cited

U.S. PATENT DOCUMENTS

| 4,105,088 | * | 8/1978 | Levijoki | ............................ | 91/372 X |
| 4,535,679 | * | 8/1985 | Kytta | .................................. | 91/376 R |
| 5,228,377 | * | 7/1993 | Watanabe | ......................... | 91/376 R |
| 5,249,505 | * | 10/1993 | Hewitt | ................................. | 91/376 R |
| 5,272,958 | * | 12/1993 | Moinard et al. | ................... | 91/369.1 |
| 5,333,534 | * | 8/1994 | Uyama | ............................... | 91/376 R |
| 6,003,426 | * | 12/1999 | Kobayashi et al. | ............... | 91/376 R |

\* cited by examiner

Primary Examiner—John E. Ryznic

(74) Attorney, Agent, or Firm—Leo H. McCormick, Jr.; Warren Comstock

(57) ABSTRACT

A brake booster (12) having a housing (14,16) with a control valve (70) located in an axial bore (54) of a hub (50) carried by a movable wall (22,24). The movable wall (22,24) separates the interior of the housing into a first chamber (26,26') and a second chamber (28,28'). The control valve (70) in a first mode communicates the first chamber (26,26') with the second chamber (28,28') to provide for equal pressures therein and in a second mode communicates the second chamber (28,28') with a surrounding environment to create a pressure differential across the movable wall (22, 24). A reaction member (96) carried by the movable wall (22,24) communicates an operational force created by the pressure differential into an output push rod (94). After the operational force overcomes a return spring arrangement (129), the output push rod (94) moves pistons (200) in a master cylinder (202) to correspondingly pressurize fluid therein which is supplied to wheel brakes to effect a brake application. The brake booster (12) is characterized by the return spring arrangement (129) having a first spring (130) with a right hand spiral and a second spring (130') having a left hand spiral. The first spring (130) is secured to a base (102) of a retainer (100) and to an end cap (136) to hold the second spring (130') in a concentric relationship between the end cap (136) and base (102). A housing (202) of a master cylinder (200) engages the end cap (136) to compress the return spring arrangement (129) to an installation height such that the movable wall (22,24) is located in a ready rest position.

7 Claims, 3 Drawing Sheets

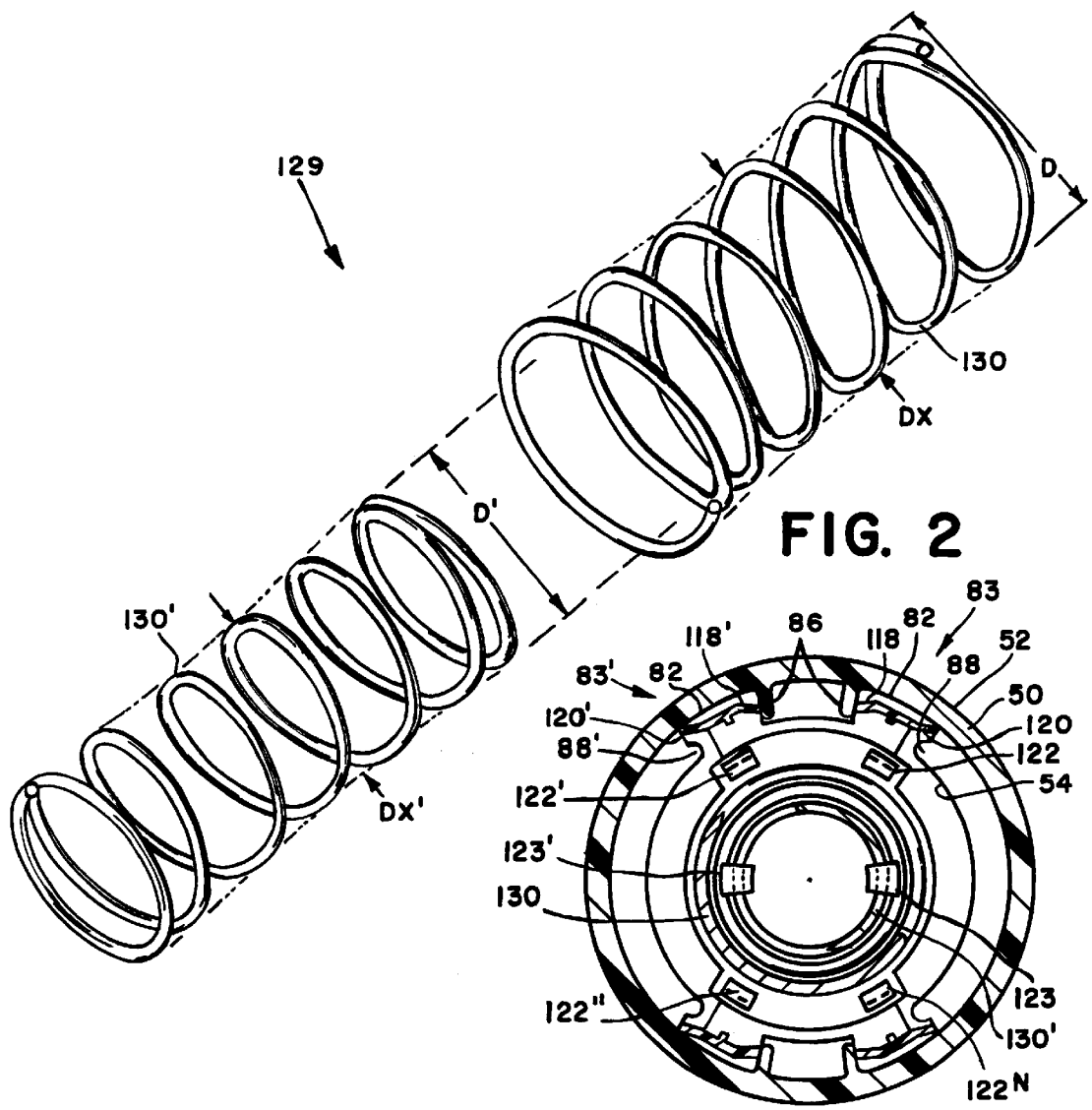
FIG. 2
FIG. 3
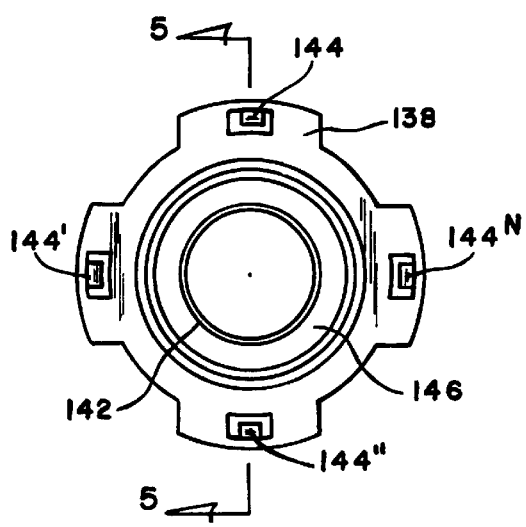
FIG. 4
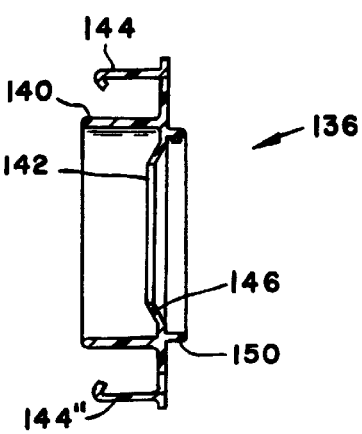
FIG. 5

RETURN SPRING ARRANGEMENT FOR BRAKE BOOSTER

BACKGROUND OF THE INVENTION

U.S. Pat. 5,233,911 discloses a typical tandem brake booster through which a force is developed to effect a brake application. In such a brake booster, corresponding first and second walls divide the interior into first and second front chambers and first and second rear chambers. The first front chamber is externally connected to a first source of fluid pressure by a conduit and internally directly connected to the second front chamber and to the first and second rear chambers by various passageways in a hub associated with the first and second walls. A control valve located in the hub is positioned such that the first fluid pressure is communicated in the first and second rear chambers through the passageways to define a rest or ready position. In responsive to an input force, the control valve is positioned such that a second fluid pressure is presented through a passageway to the first and second rear chambers to create a pressure differential across the first and second walls. This pressure differential acts on the first and second walls to develop an output force, which is provided to a master cylinder to assist in effecting a brake application. On termination of the input force, a return spring positions the control valve to a rest or ready location to define a first mode of operation where the second fluid is evacuated from the first and second rear chambers to provide for equalization of the first fluid pressure in the first and second rear chambers. This type vacuum brake booster functions in an adequate manner to provide an assist in effecting a brake application.

U.S. Pats. 4,409,885; 4,942,738; 5,313,796; 5,329,769 and 5,802,852 disclose brake booster and master cylinder arrangements wherein at least a portion of the master cylinder housing is positioned within the interior of the booster housing to define an integrated brake assembly. Such brake boosters operate in a satisfactory manner but because of their overall size occupies considerable under the hood space when installed in a vehicle. In this arrangement it is common for the brake boosters and master cylinders to manufactured in different locations and assembled as a central location. Unfortunately, the output push rod, which is considered to be part of the brake booster, must be separately shipped to the assembly location, as it is not fixed to the movable wall. U.S. Pats. 4,892,027 and 4,898,073 disclose structure, which is designed to retain an output push rod within a brake booster. However, when a housing of a master cylinder is recessed into a brake booster if the return spring is located between the shell housing and movable wall external to the hub, there is a possibility of interference between the housing of the master cylinder housing and moveable wall of the brake booster.

SUMMARY OF THE INVENTION

A primary object of the present invention is to provide concentric return springs located in an axial bore of a hub member and compressed on securing a housing of a master cylinder with a front shell of a brake booster.

The brake booster has housing with an interior divided by a movable wall assembly into at least a first front chamber and at least a first rear chamber. The wall assembly has a hub with a cylindrical projection, which extends through the housing into the surrounding environment. A control valve located in an axial bore formed in the hub has a first mode of operation wherein the front chamber which is permanently connected to a first source of pressure (vacuum) is in communication with the rear chamber to provide for equal pressures therein and a second mode of operation wherein the second chamber is in communication with a surrounding environment to create a pressure differential across the movable wall assembly. An operational force created by a pressure differential acting on the wall assembly is communicated through a reaction member into an output push rod. After the operational force overcomes a return spring, the output push rod moves pistons in a master cylinder to pressurize fluid therein. This pressurized fluid is supplied to wheel brakes to effect a brake application. The brake booster is characterized by a return spring arrangement that has a first coil of a first spring connected to a base of a retainer and a second coil connected to an end cap to hold a second concentric spring between the base and end cap. The first and second spring are oppositely wound spirals such that the coils do not mesh which could cause interference in the smooth movement of the wall assembly during the creation of an operational force. The retainer member is frictionally retained in the hub to locate the return springs within the stepped axial bore and compressed by engagement of a housing of a master cylinder from a solid height to position the movable wall in a rest position within the housing of the brake booster. The length of the first and second spring can vary in order for a smaller installation force is required bring the first and second return springs into a installation height within the stepped axial bore to a position.

An advantage of the brake booster resides in a return spring arrangement wherein concentric springs are utilized to position a movable wall in a rest position.

A further advantage of the brake booster resides in the use of multiple return springs to reduce the diameter and length as compared with a single spring for performing a similar function.

A still further advantage of the brake booster resides in the use of oppositely wound spiral springs to avoid a possible interference by coils being compresses during the transfer of an operational force from a movable wall to an output push rod.

A still further advantages of the brake booster resides in locating a return spring arrangement within a stepped axial bore of a hub and relying on the engagement with a housing of the a master cylinder to set an installation height to define a rest position for a movable wall.

Brief Description of the Drawings

FIG. 2 is a perspective view of a concentric spring arrangement for use in the brake booster of FIG. 1;

FIG. 3 is a sectional view taken along line 3—3 of FIG. 1 showing a locking arrangement for frictionally positioning a retainer in the hub;

FIG. 4 is a front view of an end cap associated with the retainer for holding the spring arrangement of FIG. 2 in the axial bore of the hub of the movable wall in the booster of FIG. 1;

FIG. 5 is a sectional view along line 5—5 of FIG. 4; and

DETAILED DESCRIPTION

Figure 1:
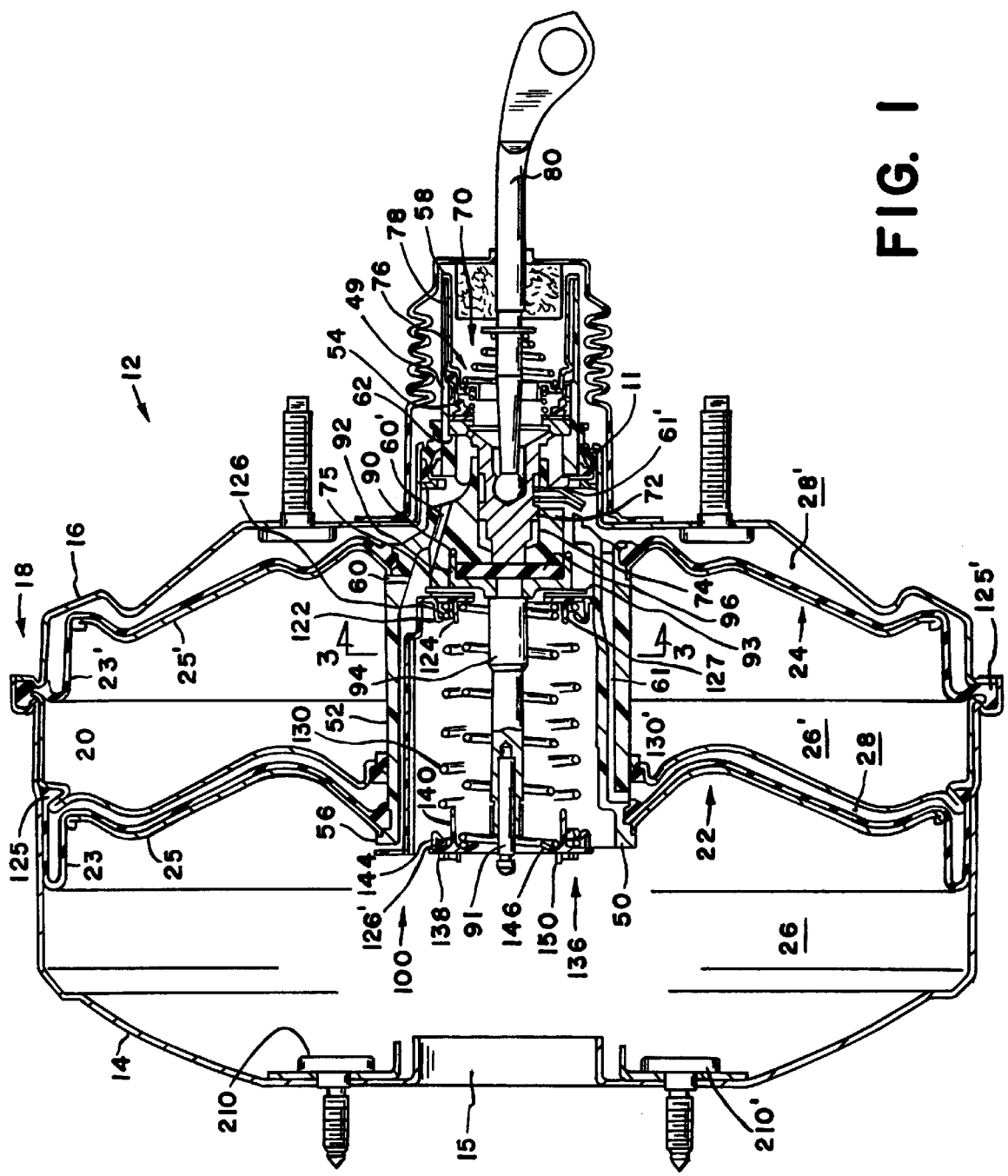
FIG. 1 is a sectional view of a brake booster made according to the principals of the present invention.

FIG. 1 illustrates a brake booster 12 having a housing formed by joining a front shell 14 to a rear shell 16 through a locking arrangement 18. A partition arrangement 20 of the type disclosed in U.S. Pat. No. 3,897,718, engages a cylindrical body or hub 50 and with movable walls 22 and 24 separate the interior of the housing into front 26,26' and rear 28,28' chambers. The movable walls 22 and 24 correspondingly have a diaphragm 23,23' and a backing plate 25,25' that are fixed to the peripheral surface 52 of hub 50. Hub 50 has a stepped axial bore 54 which extends from a first end 56 located in the front chamber 26 to a second end 58 which passes through the rear shell 16 and is located in a surrounding environment. Hub 50 has a first series of passageways 60,60' through which the front chambers 26,26' are permanently connected to each other upstream of a valve seat 62 and a second series of passageways 61,61' through which the rear chambers 28,28' are selectively connected to each other downstream of vacuum seat 62. A control valve 70, of the type disclosed in U.S. Pat. No. 4,953,446, has a plunger 72 located on bearing surface 74 of hub 50, a poppet assembly 76 retained in the stepped axial bore 54 by sleeve 78 and a push rod 80. The bearing surface 74 is concentric with and holds plunger 72 in an aligned axial position within the stepped axial bore 54.

Figure 6:
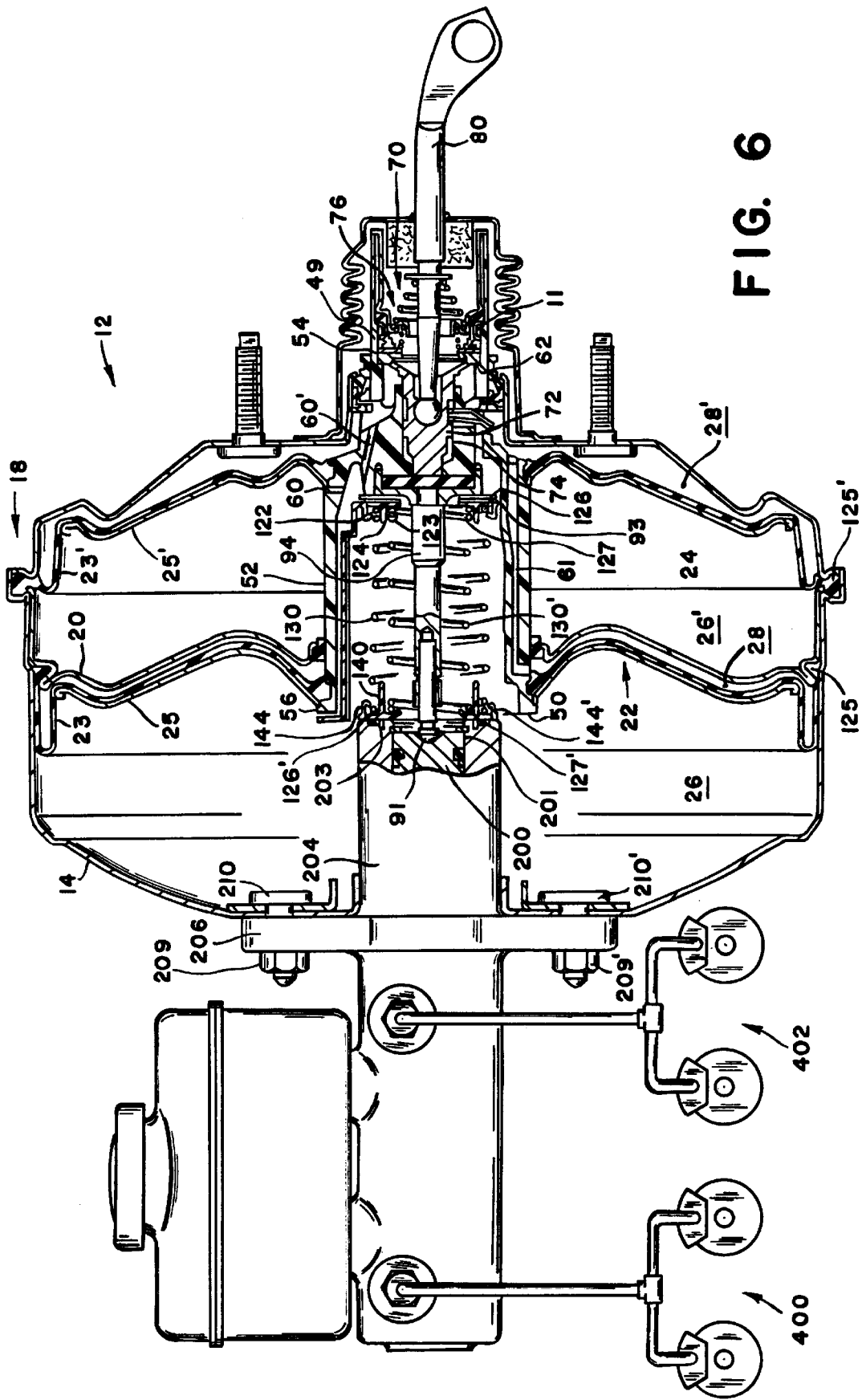
FIG. 6 is sectional view of the brake booster of FIG. 1 with a master cylinder attached thereto for use in a brake system.

The stepped axial bore 54, as best shown in FIGS. 1, 3 and 6 is further characterized by a plurality of arcuate slots 82,82', . . . 82" located in the peripheral surface of stepped axial bore 54. The plurality of arcuate slots 82,82', . . . 82" extend from the first end 56 to a face 75 adjacent bearing surface 74 of hub 50. The plurality of arcuate slots 82,82', . . . 82" are identical and as shown in FIG. 3 by a central radial rib or wall 86. The hub 50 includes a plurality of arcuate lips 88,88', . . . 88" on the interior surface of hub 50 which cover a portion of the arcuate slots 82,82', . . . 82" . The central radial rib or wall 86 along with the plurality of arcuate lips 88,88', . . . 88" define a plurality of locking surfaces or arcs 83,83', . . . 83" within the stepped axial bore 54.

A plate 93 located in the stepped axial bore 54 engages face 75 on hub 50 and with retainer 100 holds a cup 92 of the output push rod 94 in a annular groove 90 of hub 50. The annular groove 90 assists in holding shaft 91 in axial alignment with the stepped axial bore 54. In addition, cup 92 also carries a reaction member 96 that is positioned adjacent face 75'. When brake booster 12 is in operation, reaction member 96 receives an operational force from hub 50 that is communicated into the output push rod 94.

The retainer 100 is of a type fully disclosed in co-pending U.S. patent application Ser. No. 00/7515 which has a base 102 with an irregular peripheral surface 101, an axial opening 104 through the base 102 and a plurality of axial legs 106, 106', . . . 106" which extend from the base 102. The plurality of axial legs 106, 106',. . . 106" are joined together by a ring-flange 103 to define a rigid structure. Each of the plurality of legs 106, 106', . . . 106" is identical and have a T shape defined by a central rib 116 with first 118 and second 120 arms extending therefrom. The first 118 and second 120 arms, which are designed to flex about the central rib 116, have a fixed width which is greater than the width of locking surfaces or arc 83,83', . . . 83" defined in the arcuate slots 82,82', . . . 82" in hub 50. The plurality of legs 106, 106', . . . 106" are correspondingly located in the plurality of arcuate slot 82,82', . . . 82" along the axis of the stepped bore 54. The first arm of each leg tangentially engages the central rib or wall 86 while the second arm is located between a lip and side of a slot. Since the width of the first 118 and second 120 arms is greater that the width of a corresponding locking surface 83 frictional resistance occurs, the arms 118 and 120 flex to hold the legs 106, 106', . . . 106" of the retainer 100 are pushed into the stepped axial bore 54. The base 102 engages plate 93 which in turn contacts head 92 of the output push rod 94 to hold shaft 91 which extends through to the axial opening 104 in axial alignment with the axis of the stepped axial bore 54. The base 102 further has an annular ring 124 concentrically spaced from opening 104 and a plurality of hooks or tabs 122, 122'. . . 122" concentrically spaced from the annular ring 124. The plurality of hooks or tabs 122, 122'-122" engage and hold a first coil 126 of a first return spring 130 of spring arrangement 129 against base 102.

The retainer 100 further includes an end cap 136 as shown in FIGS. 4 and 5 includes a base 138 with an annular projection or ring 140 concentrically spaced from an opening 142 and a plurality of hooks or tabs 144, 144'. . . 144" concentrically spaced from the annular projection or ring 140. The plurality of hooks or tabs 144, 144'. . . 144" engage a second coil 126' of return spring 130 to assist in holding a second return spring 130' between base 138 and base 102. Base 102 also includes a second plurality of hooks or tabs 123, 123', . . . 123" which engage a first coil 127 of the second return spring 130' to assist in retaining the second return spring 130' between base 138 and base 102. Base 138 further includes a tapered flange 146 leading into opening 142, the slope of the tapered flange 146 provides a guide for end 91 of push rod 94 with respect to a piston 200 located in master cylinder 202, see FIG. 6. Base 138 includes an aligning rib 150 that is located in a groove 203 in housing 204 of master cylinder 202. Flange 206 of housing 204 is connected to the front shell 14 by mounting bolts 210,210' such that the bore 201 in master cylinder 202 is axially aligned with the stepped axial bore 54 while locating rib 150 in groove 203 along with rings 124,140 keep springs 130, 130' spaced apart.

The return spring arrangement 129 which is best illustrated in FIG. 2 includes the first return spring 130 which has a right hand spiral and the concentric second return spring 130' which has a left hand spiral. The respective center coils $D_x, D_x'$ of the first and second return springs 130,130' have a smaller diameter than the diameter $D, D'$ of the first and second end coils and as a result the center coils may expand on being compressed but do not expand to exceed the diameter of the first and second end coils to prevent engagement on compression. Further, the height of annular projection 124 on base 102 and annular projection 140 on base 138 of end cap assist in maintaining the concentric spring arrangement 129 in a desired spaced apart relationship.

METHOD OF ASSEMBLY

As is common with a tandem brake booster 12 of the type illustrated in FIG. 1, various components are pre-assembled and in accordance with the present invention the return spring 130,130' are assembled with retainer 100 in the following manner. The first return spring 130 is pushed onto base 102 such that hooks or tabs 122, 122'. . . 122" engage the first coil 126 and retain the first coil 126 against the base 102. The end 127 of the second return spring 130 is place against base 102 and now end cap 136 is pushed onto the return springs 130, 130' such that hooks or tabs 144, 144'. . . 144" engage the second coil 126 to hold the second coil 126 against base 138 and at the same time engage 127 of the second return 130' to cage the second return spring 130' between base 138 and base 102.

In the assembly of brake booster 12, the first 22 and second 24 walls are connected to cylindrical body or hub 50 and the control valve 70 retained in the axial stepped bore 54. The cup 92 of output push rod 94 is located in groove 90 such that shaft 91 is aligned along the axis of the stepped axial bore 54. Plate 93 is inserted into the stepped axial bore 54 such that the passageways in hub 50 are not blocked and the sub-assembly of retainer 100 and return spring 130,130' thereafter inserted into the stepped axial bore 54. The offset 111,111' of legs 106.106' from base 102 allows for alignment of branches 112 and 114 to be inserted into slots 82,82' such that arm 118 engages rib 86 and arm 120 engages the sides 81,81'. Since the arcuate width of arms 118 and 120 is greater than a corresponding locking arc 83 friction occurs as retainer 100 is pushed into the stepped axial bore 54. When base 102 engages face 75, plate 93 and cup 92 will be located in the stepped axial bore 54 such that reaction member 96 is adjacent face 75' of bearing surface 74 and shaft 91 is in axial alignment with the stepped axial bore 54. In this assembly, the retainer 100 with the return springs 130,130' are completely located in the stepped axial bore 54. Thereafter, the cylindrical body 49 of hub 50 is passed through bearing 11 on the rear shell 12 and bead 125 respectively positioned to the front shell 12 by partition 20 and bead 125' secured to the front shell 12 and rear shell 14 by the locking arrangement 18 to complete the assembly of the brake booster 12. This brake booster 12 is fully assemblies and can be transported to another location as the return springs 130,130' and output push rod 94 are completely retained within the stepped axial bore 54 of the hub by retainer 100 and as a result will not be lost or mis-alinged when joined with a master cylinder.

The brake booster 12 when presented at another location can be joined to an appropriate master cylinder 202 in the following manner.

After the end 93 of shaft 91 of the output push rod 94 is adjusted to the stroke of the pistons 200 of the master 202, sleeve 148 which extends from piston 200 is inserted in opening 15 in the front shell 14. The flange 206 on housing 204 is aligned with mounting bolts 210,210' and as sleeve 148 moves into the front chamber 26 it first encounters opening 142 on end cap 136. The slope 146 provides a guide so that sleeve 148 passes through opening 142 and receives end 93 of shaft 91. Further movement of housing 204 into chamber 26 brings aligning rib 150 into engagement with groove 203 on housing 204 such that the return springs 130,130' and bore 201 in the master cylinder 202 are aligned with the stepped axial bore 54. When nuts 209,209' are tightened on bolts 210,210' flange 206 is brought into engagement with the front shell 14 and the return spring 130,130' compressed to position the wall 22,24 in a rest position to complete assembly of the booster assembly as illustrated in FIG. 6.

Mode of Operation

In response to an input force applied to input rod 80, plunger 72 moves to allow poppet member 76 to engage seat 54 and terminate communication between the front chambers 26,26' to the rear chambers 28,28' through the stepped axial bore 54. Further movement of plunger 72 moves face 73 away from the poppet member 76 to allow air from the surrounding environment to be communicated to the rear chambers 28,28' by way of passageways 61,61' to create a pressure differential across walls 22,24. This pressure differential acts on walls 22,24 to develop an operational force that is communicated through hub 50 into reaction member 96. After overcoming the force of return spring 130,130', the operational force moves output rod 94 which in turn moves pistons 200 in the master cylinder 202 to pressurize fluid in the master cylinder 202. The fluid pressurized by the master cylinder pistons 200 is communicated to the wheel brakes 400,402 to effect a corresponding brake application.

I claim:

1. A brake booster having a first housing with an interior separated into at least a first chamber and a second chamber by a wall connected to a hub, said hub has a cylindrical body with a stepped axial bore that extends from a first end to a second end, a control valve located in said stepped axial bore for sequentially connecting said first chamber with said second chamber to provide for the equalization of fluid pressure therein in a first mode of operation and in response to an input signal defining a second mode of operation where communication between said first and second chambers is interrupted while initiating communication between said second chamber and a surrounding environment to allow air to enter said second chamber and create a pressure differential across said wall, said pressure differential acting on said wall to develop an output force which acts on said hub to develop an operational force which is communicated through a reaction member into an output push rod, said operational force, after overcoming a return spring arrangement moving said output push rod which supplies pistons located in a master cylinder with an operational input to pressurize fluid in the master cylinder which is communicated to wheel brakes to effect a brake application, said brake booster being characterized by a return spring arrangement having a first spring with a first coil secured to a retainer and a second coil secured to an end cap to concentrically hold a second spring between said retainer and said end cap.

2. The brake booster as recited in claim 1 wherein said return spring arrangement is characterized by said first spring having a right hand spiral coils and said second spring having a left hand spiral coils to reduce the possibility of engagement of said right hand and left hand coils on being compressed by movement of said movable wall.

3. The brake booster as recited in claim 2 wherein said right hand spiral coils and said left hand spiral coils each have a smaller diameter at a mid-point than at their end coils to allow for radial expansion during compression such that the mid-point coils will not exceed the diameter of end coils which are secured to said retainer and said end cap.

4. The brake booster as recited in claim 3 wherein each of said first return spring is further characterized by having a free height greater than said second return spring, said master cylinder having a housing that engages said end cap, said master cylinder on being attached to said brake booster compressing said first and second return springs to establish an installation height to position said movable wall in a rest position.

5. The brake booster as recited in claim 4 wherein said retainer is characterized by a first base having a first annular projection spaced from a first axial opening and said end cap has a second base with a second annular project spaced from a second axial opening, said first and second annular projection assisting in maintaining said first and second return springs in a concentric relationship with respect to said axial bore.

6. The brake booster as recited in claim 5 wherein said first base is further characterized by a first plurality of tabs that engage and hold a first coil of said first return spring in said stepped axial bore.

7. The brake booster as recited in claim 6 wherein said second base is further characterized by a second plurality of tabs that engage and hold a second coil of said first return spring to hold said second return spring between said end cap and said retainer.

* * * * *